Inventors:
Louis F. Blume,
William O. Dwyer,
by Charles E. Tullar
Their Attorney.

Patented Apr. 29, 1930

1,756,846

UNITED STATES PATENT OFFICE

LOUIS F. BLUME, OF PITTSFIELD, MASSACHUSETTS, AND WILLIAM O. DWYER, OF KINGSTON, ONTARIO, CANADA, ASSIGNORS TO GENERAL ELECTRIC COMPANY, A CORPORATION OF NEW YORK

ELECTRICAL INDUCTION APPARATUS

Application filed April 22, 1929. Serial No. 356,988.

Our invention relates to electrical induction apparatus such as transformers and the like and more particularly to apparatus of this character in which the windings are provided with electrostatic shields for maintaining uniform distributions of potential in the windings in accordance with the principles explained in Letters Patent of the United States No. 1,585,448 to James M. Weed, dated May 18, 1926.

A winding of a transformer or the like having one terminal grounded may be effectively shielded by a conductive member or members properly located near the winding and connected electrically to the winding circuit. There are many cases where separate groups of winding turns are connected in series such as two or more series connected transformers or a transformer and a reactor connected in series or the separate groups of turns of a transformer winding of the interleaved type. In such cases as these, if each group of turns is provided with a shield connected electrically to the terminal of the group, the shield may maintain a desired distribution of the potential between the terminals of each group but there is no control of the distribution of potential between the several groups. The general object of the invention is to provide an improved electrostatic shielding arrangement for maintaining a uniform distribution of potential between all the turns of two or more separate series connected groups of turns.

Figure 1:
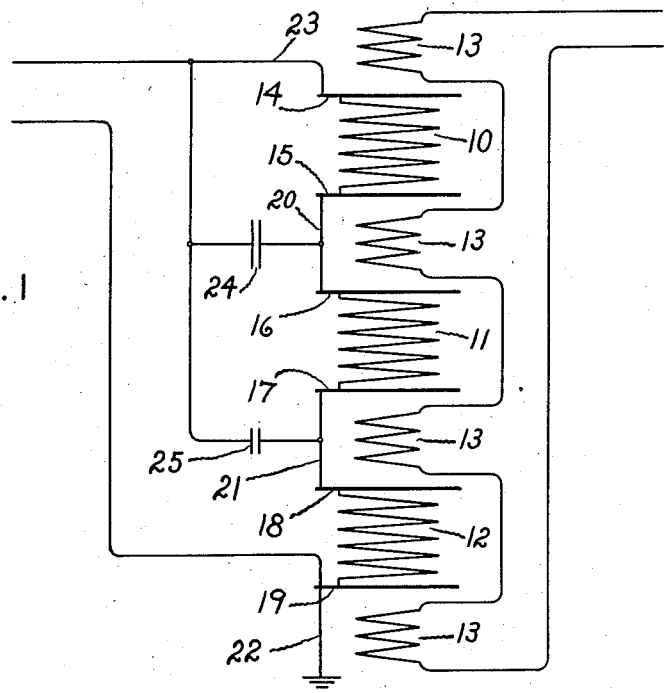
Figure 2:
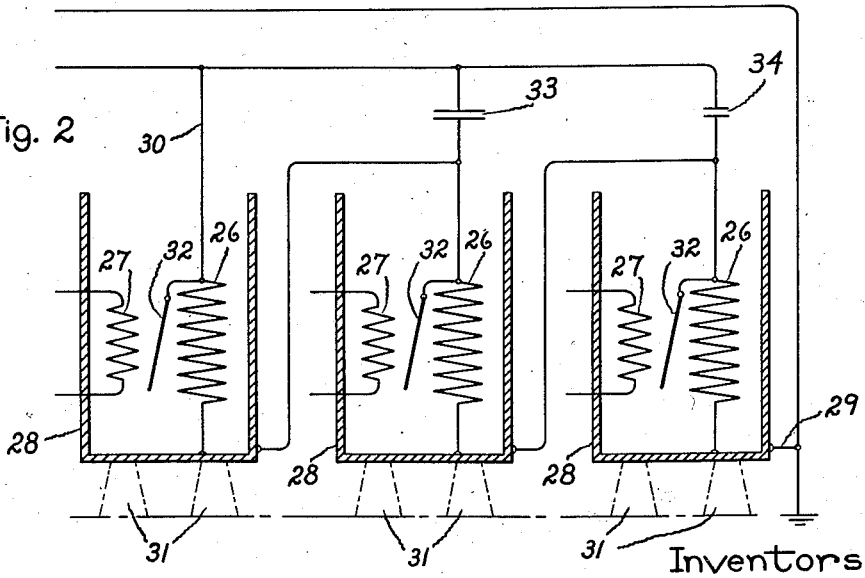

The invention will be better understood from the following description taken in connection with the accompanying drawing in which Fig. 1 is a diagrammatic view of the two windings of a transformer of the interleaved type, one of the windings being shielded in accordance with the invention, and Fig. 2 is a diagrammatic view of three high voltage transformer units with the high voltage windings of the three units connected in series and shielded in accordance with the invention.

The high voltage winding of the transformer indicated in Fig. 1 includes three sections or groups of turns 10, 11 and 12 interleaved with sections of a low voltage winding 13. The conductor forming the winding section 10 progresses uniformly across the space between two conductive end plates or shields 14 and 15 which are connected respectively to the two terminals of this winding section. The winding sections 11 and 12 are similarly arranged and connected between a pair of shields 16 and 17 and a pair of shields 18 and 19 respectively. Conductors 20 and 21 connect the shields 15 and 16 and the shields 17 and 18 respectively together to maintain the two shields of each pair at the same potential and to connect the three sections 10, 11 and 12 of the high voltage winding in series between its grounded terminal 22 and its high voltage terminal 23. The two shields 15 and 16 are connected to the high voltage terminals 23 through a condenser 24 and the two shields 17 and 18 are connected to the high voltage terminal 23 through a condenser 25.

If a high voltage is suddenly applied to the high voltage terminal 23 or if the voltage of this terminal is suddenly changed, the shield 14 will be instantly charged to the new terminal voltage and each of the shields 15, 16, 17 and 18 will be instantly charged through the condenser 24 or the condenser 25 to a new voltage which will always be the same fractional part of the terminal voltage. The shield 19 will of course always remain at ground potential. Thus, the total voltage will be always distributed between the several winding sections or groups of winding turns 10, 11 and 12 in the same proportion. The pair of shields associated with each winding section will also induce an electric field which will maintain a uniform distribution of potential through the winding section between them. In addition to this uniform distribution of potential in the several winding sections, the voltages of the shields 15, 16, 17 and 18 are controlled and maintained at all times at such values that the distribution of voltage throughout the winding will be uniform. This voltage control of the shields 15, 16, 17 and 18 is effected by the charging currents supplied to them through the condensers 24 and 25 which have suitable capacities to maintain the charging currents at the required values. The capacity of the condenser 24 must of course be greater than that of the condenser 25 because the voltage of the shields 15 and 16 is greater than that of the shields 17 and 18.

The invention is shown in Fig. 2 as applied to three transformer units connected in series to produce a voltage which is approximately the sum of the voltages of the units. Each unit includes a high voltage secondary winding 26 and a low voltage primary winding 27, both windings being enclosed in a casing 28. The high voltage windings 26 are connected in series through the casings 28 between a grounded terminal 29 and a high voltage terminal 30. The casings 28 are mounted on insulating supports 31.

An electrostatic shield 32 is spaced from the turns of each high voltage winding 26, the capacity between each of these windings and its shield being greatest near the higher voltage end of the winding and decreasing gradually toward its lower voltage end. The shield 32 which is adjacent to the winding 26 nearest the high voltage terminal 30 is connected to this terminal. The shields 32 which are adjacent to the two windings 26 nearest the grounded terminal 29 are connected to the high voltage terminal 30 through condensers 33 and 34 respectively. Each shield 32 supplies charging current to the turns of the adjacent winding to maintain at all times a uniform distribution of potential between the terminals of the winding and the shields are maintained at suitable potentials through their connections to the high voltage terminal 30 to distribute the total potential uniformly between the windings. None of the windings nor any of the turns in any of them, therefore, can ever be subjected to more than its proper proportion of the total voltage.

The invention has been explained by describing and illustrating certain arrangements and applications thereof but it will be obvious that changes may be made without departing from the scope of the invention as defined in the appended claims.

What we claim as new and desire to secure by Letters Patent of the United States, is:—

1. Electrical induction apparatus having winding turns connected in series between a grounded terminal and a high voltage terminal, an electrostatic shield adjacent part of said turns near the high voltage terminal and electrically connected to said high voltage terminal, an electrostatic shield adjacent another part of said turns nearer said grounded terminal, and an electrical connection including a condenser between said latter shield and said high voltage terminal.

2. Electrical induction apparatus including groups of winding turns connected in series between a grounded terminal and a high voltage terminal, and an electrostatic shield adjacent each of said groups of turns, each of said shields being electrically connected to said high voltage terminal, the connection from the shield nearest said grounded terminal including a condenser.

3. Electrical induction apparatus including a plurality of windings connected in series between a grounded terminal and a high voltage terminal, and an electrostatic shield adjacent each of said windings, each of said shields being electrically connected to said high voltage terminal, the connection from the shield nearest said grounded terminal including a condenser.

In witness whereof, we have hereunto set our hands, this twelfth day of April, 1929 and this seventeenth day of April, 1929.

LOUIS F. BLUME.
WILLIAM O. DWYER.